(12) United States Patent
Onimaru

(10) Patent No.: US 11,408,490 B2
(45) Date of Patent: Aug. 9, 2022

(54) CHAIN TENSIONER

(71) Applicant: NTN Corporation, Osaka (JP)

(72) Inventor: Kouichi Onimaru, Shizuoka (JP)

(73) Assignee: NTN CORPORATION, Osaka (JP)

( * ) Notice: Subject to any disclaimer, the term of this patent is extended or adjusted under 35 U.S.C. 154(b) by 53 days.

(21) Appl. No.: 16/978,530

(22) PCT Filed: Feb. 28, 2019

(86) PCT No.: PCT/JP2019/007848
§ 371 (c)(1),
(2) Date: Sep. 4, 2020

(87) PCT Pub. No.: WO2019/172078
PCT Pub. Date: Sep. 12, 2019

(65) Prior Publication Data
US 2021/0018073 A1 Jan. 21, 2021

(30) Foreign Application Priority Data

Mar. 5, 2018 (JP) .............................. JP2018-038482

(51) Int. Cl.
*F16H 7/08* (2006.01)
*F02B 67/06* (2006.01)

(52) U.S. Cl.
CPC .............. *F16H 7/08* (2013.01); *F02B 67/06* (2013.01); *F16H 2007/0806* (2013.01);
(Continued)

(58) Field of Classification Search
CPC .............. F16H 7/08; F16H 2007/0802; F16H 2007/0806; F16H 2007/0812;
(Continued)

(56) References Cited

U.S. PATENT DOCUMENTS 4,997,411 A * 3/1991 Breon ....................... F16F 1/08
474/110
5,087,225 A * 2/1992 Futami ..................... F16H 7/08
474/110
(Continued)

FOREIGN PATENT DOCUMENTS

DE 19538401 A1 * 12/1996 ................ F01L 1/02
EP 2 267 335 12/2010
(Continued)

OTHER PUBLICATIONS

International Search Report dated Apr. 2, 2019 in International (PCT) Patent Application No. PCT/JP2019/007848.
(Continued)

*Primary Examiner* — Michael R Mansen
*Assistant Examiner* — Raveen J Dias
(74) *Attorney, Agent, or Firm* — Wenderoth, Lind & Ponack, L.L.P.

(57) ABSTRACT

A chain tensioner includes a sleeve fixedly disposed in a cylinder, with a first end of the sleeve inserted in a plunger and a second end of the sleeve protruding out of the plunger. A cylindrical space is defined between an outer periphery of the sleeve and an inner periphery of the cylinder. An oil supply passage opens to the cylindrical space. A communication passage is defined in the sleeve and provides communication between the cylindrical space and a reservoir chamber.

16 Claims, 7 Drawing Sheets

(52) U.S. Cl.
CPC ............... *F16H 2007/0812* (2013.01); *F16H 2007/0855* (2013.01); *F16H 2007/0859* (2013.01); *F16H 2007/0897* (2013.01)

(58) Field of Classification Search
CPC .......... F16H 7/0848; F16H 2007/0855; F16H 2007/0859; F16H 2007/0891; F16H 2007/0895; F16H 2007/0897; F16H 7/0834; F16H 7/0836; F16H 2007/0851; F16H 2007/0853; F02B 67/00; F02B 67/06

See application file for complete search history.

(56) References Cited

U.S. PATENT DOCUMENTS

| | | | | |
|---|---|---|---|---|
| 5,090,946 A * | 2/1992 | Futami | ............... | F16H 7/08 474/104 |
| 5,310,385 A * | 5/1994 | Suzuki | ............... | F16H 7/08 474/110 |
| 5,314,388 A * | 5/1994 | Suzuki | ............... | F16H 7/08 474/110 |
| 5,707,309 A * | 1/1998 | Simpson | ............ | F16H 7/08 474/110 |
| 5,931,754 A * | 8/1999 | Stief | ............... | F16H 7/0848 474/109 |
| 6,086,497 A * | 7/2000 | Fukuda | ............ | F16H 7/0836 474/101 |
| 6,203,461 B1 * | 3/2001 | Watanabe | .......... | F16H 7/0848 474/110 |
| 6,383,103 B1 * | 5/2002 | Fujimoto | ............ | F01L 1/02 474/109 |
| 6,935,978 B2 * | 8/2005 | Hayakawa | .......... | F16H 7/0836 474/109 |
| 8,740,736 B2 * | 6/2014 | Kurematsu | .......... | F16H 7/0848 474/110 |
| 10,670,118 B2 * | 6/2020 | Nakata | .......... | F16H 7/0848 |
| 2001/0006917 A1 * | 7/2001 | Hashimoto | ............ | F16H 7/08 474/110 |
| 2003/0070717 A1 * | 4/2003 | Hashimoto | .......... | F16H 7/0848 137/825 |
| 2003/0186765 A1 * | 10/2003 | Konishi | ............ | F16H 7/0836 474/109 |
| 2005/0014587 A1 * | 1/2005 | Konishi | ............ | F16H 7/0836 474/110 |
| 2005/0197223 A1 * | 9/2005 | Namie | ............ | F16H 7/0848 474/110 |
| 2005/0272542 A1 * | 12/2005 | Yoshida | ............ | F16H 7/0836 474/110 |
| 2008/0090685 A1 * | 4/2008 | Namie | ............ | F16H 7/0848 474/110 |
| 2008/0207365 A1 * | 8/2008 | Namie | ............ | F16H 7/0836 474/110 |
| 2008/0220918 A1 * | 9/2008 | Namie | ............ | F16H 7/0848 474/110 |
| 2008/0318718 A1 * | 12/2008 | Namie | ............ | F16H 7/0848 474/110 |
| 2010/0298078 A1 * | 11/2010 | Hirayama | ............ | F16H 7/0848 474/110 |
| 2011/0183796 A1 * | 7/2011 | Kurematsu | ............ | F16H 7/0848 474/110 |
| 2011/0256970 A1 * | 10/2011 | Nakano | ............... | F16H 7/0836 474/110 |
| 2011/0287880 A1 * | 11/2011 | Hayami | ............... | F16H 7/0848 474/111 |
| 2012/0122619 A1 * | 5/2012 | Yoshida | ............... | F16H 7/0848 474/110 |
| 2012/0225743 A1 * | 9/2012 | Ishii | ............... | F16H 7/0848 474/110 |
| 2012/0329590 A1 * | 12/2012 | Yoshii | ............... | F16H 7/0848 474/110 |
| 2013/0274045 A1 * | 10/2013 | Yoshida | ............... | F16H 7/0848 474/101 |
| 2013/0281238 A1 * | 10/2013 | Kurematsu | ............... | F16H 7/08 474/101 |
| 2013/0288836 A1 * | 10/2013 | Kurematsu | ............ | F16H 7/0836 474/110 |
| 2013/0331212 A1 * | 12/2013 | Kurematsu | ............ | F16H 7/0836 474/110 |
| 2014/0100068 A1 * | 4/2014 | Kurematsu | ............... | F16H 7/08 474/110 |
| 2016/0084359 A1 * | 3/2016 | Wigsten | ............... | F16H 7/0836 474/110 |
| 2016/0186838 A1 * | 6/2016 | Kurematsu | ............... | F16H 7/08 474/110 |
| 2016/0290447 A1 * | 10/2016 | Kunimatsu | ............. | F16K 17/02 |
| 2016/0305512 A1 * | 10/2016 | Takagi | ............... | F16H 7/08 |
| 2016/0348765 A1 | 12/2016 | Ishikawa et al. | | |
| 2016/0356365 A1 * | 12/2016 | Crump | ............... | F16H 7/0848 |
| 2017/0059012 A1 * | 3/2017 | Watanabe | ............ | F16H 7/0848 |
| 2017/0130807 A1 * | 5/2017 | Kurematsu | ............ | F16H 7/0848 |
| 2017/0255222 A1 * | 9/2017 | Ullein | ............... | F16H 7/08 |
| 2017/0356529 A1 * | 12/2017 | Simmons | ............ | F16H 7/0848 |
| 2018/0180191 A1 * | 6/2018 | Shinoyama | ............... | F16H 7/08 |
| 2018/0274638 A1 * | 9/2018 | Watanabe | ............ | F16H 7/0848 |
| 2018/0313434 A1 * | 11/2018 | Watanabe | ............... | F16H 7/08 |
| 2019/0120343 A1 * | 4/2019 | Watanabe | ............ | F16H 7/0848 |
| 2019/0170224 A1 * | 6/2019 | Fuhrmann | ............... | F16H 7/08 |
| 2019/0257391 A1 * | 8/2019 | Watanabe | ............ | F16H 7/0848 |
| 2020/0284325 A1 * | 9/2020 | Hunt | ............... | F16H 7/08 |
| 2021/0285524 A1 * | 9/2021 | Shi | ............... | F16H 7/0834 |

FOREIGN PATENT DOCUMENTS

| | | | |
|---|---|---|---|
| JP | 2010-286090 | 12/2010 | |
| JP | 2011-127705 | 6/2011 | |
| JP | 2016-223506 | 12/2016 | |
| WO | WO-2016012019 A1 * | 1/2016 | ........... F16H 7/0848 |

OTHER PUBLICATIONS

International Preliminary Report on Patentability dated Sep. 8, 2020 in International (PCT) Patent Application No. PCT/JP2019/007848.

* cited by examiner

CHAIN TENSIONER

TECHNICAL FIELD

The present invention relates to chain tensioners used to maintain tensions of mainly chains for driving cams of automotive engines, and chains for driving oil pumps.

BACKGROUND ART

Chain transmission systems used for engines of, e.g., automobiles are used, for example, to transmit the rotation of crankshaft to camshafts; to transmit the rotation of a crankshaft to engine accessories such as an oil pump, a water pump and a supercharger; to transmit the rotation of a crankshaft to a balancer shaft; and to couple together intake cams and exhaust cams of a twin-cam engine. Chain tensioners are used to keep the tension in the chain of such a chain transmission system within a proper range.

The inventor of the present application proposed a chain tensioner used for the above-described purposes in JP 2010-286090 A. The chain tensioner disclosed in JP 2010-286090 A includes a tubular cylinder having an open end and a closed end; a tubular cylinder axially slidably supported within the inner periphery of the cylinder; a return spring biasing the plunger in the direction in which the plunger protrudes out of the cylinder; a sleeve fixed in position within the cylinder with one end thereof inserted in the plunger and the other end protruding out of the plunger, a check valve disposed at the end of the sleeve inserted in the plunger; a pressure chamber defined within the plunger such that its volume changes with the axial movement of the plunger; and a leakage gap defined between the outer periphery of the sleeve and the inner periphery of the plunger. The cylinder has an oil supply passage for introducing hydraulic oil from outside the cylinder into the cylinder. The end of the oil supply passage located at the inside of the cylinder opens to a space inside of the sleeve.

The chain tensioner of JP 2010-286090 A is configured such that when the tension in the chain increases while the engine is running, the plunger moves in the direction in which the plunger is pushed into the cylinder (this direction is hereinafter referred to as the "pushed-in direction) by the tension in the chain, thereby absorbing the tension in the chain. At that time, due to the viscous resistance of the hydraulic oil flowing out from the pressure chamber through the leakage gap, a damping force is produced, allowing the plunger to move slowly. On the other hand, when the tension in the chain decreases while the engine is running, the plunger moves in the direction in which the plunger protrudes out of the cylinder (this direction is hereinafter referred to as the "protruding direction) due to the biasing force of the return spring, thereby taking up the slack in the chain. At that time, the check valve opens, allowing hydraulic oil to flow through the oil supply passage into the pressure chamber, so that the plunger moves rapidly.

Since the chain tensioner of JP 2010-286090 A is structured such that hydraulic oil in the plunger flows through the leakage gap between the inner periphery of the plunger and the outer periphery of the sleeve, and flows out to the end of plunger inserted in the cylinder, if the chain tensioner is used with the protruding direction of the plunger being an obliquely downward direction, air is less likely to enter the pressure chamber in the plunger, and also, any air that may enter the pressure chamber can be effectively discharged through the leakage gap.

SUMMARY OF THE INVENTION

Object of the Invention

The inventor of the present application prepared, and assessed the performance of, a chain tensioner as disclosed in JP 2010-286090 A, and discovered that this chain tensioner is poor in followability to the slack in the chain. Then, upon investigation, the inventor discovered that the followability is poor because: between the outer periphery of the sleeve and the inner periphery of the cylinder, a cylindrical space is present of which the volume changes with the axial movement of the plunger; when the plunger moves in the protruding direction, and as a result, the volume of the cylindrical space increases, the pressure in the cylindrical space decreases because no hydraulic oil or air is supplied into the cylindrical space; and the decreased pressure in the cylindrical space interferes with the movement of the plunger in the protruding direction.

Also, with the recent trend of using smaller oil pumps in automobiles, the need to reduce the oil consumption by a chain tensioner is increasing.

An object of the present invention is to provide a chain tension which shows excellent followability to the slack of the chain and consumes less oil.

Means for Achieving the Object

In order to achieve this object, the present invention provides a chain tensioner comprising:

a tubular cylinder having an open end and a closed end;

a tubular plunger axially slidably supported by an inner periphery of the cylinder, the plunger having an open end inserted in the cylinder, and a closed end protruding out of the cylinder;

a return spring biasing the plunger in the direction in which the plunger protrudes out of the cylinder;

a sleeve fixedly disposed in the cylinder, with one end of the sleeve inserted in the plunger and the other end of the sleeve protruding out of the plunger;

a check valve disposed at the end of the sleeve inserted in the plunger, the check valve being configured to allow only a flow of hydraulic oil from inside the sleeve toward the outside of the sleeve;

a pressure chamber defined in the plunger such that the volume of the pressure chamber changes with axial movement of the plunger;

a leakage gap defined between an outer periphery of the sleeve and an inner periphery of the plunger such that, when the volume of the pressure chamber decreases, hydraulic oil leaks from the pressure chamber through the leakage gap;

a cylindrical space formed between the outer periphery of the sleeve and the inner periphery of the cylinder, the cylindrical space being defined by the plunger such that the volume of the cylindrical space changes with the axial movement of the plunger;

an oil supply passage formed in the cylinder so as to introduce hydraulic oil from outside the cylinder to inside the cylinder, the oil supply passage opening to the cylindrical space; and a communication passage defined in the sleeve and providing communication between the cylindrical space and the interior of the sleeve.

In this arrangement, when the plunger moves in the protruding direction, and the volume of the cylindrical space increases, hydraulic oil directly flows into the cylindrical space from the oil supply passage, so that the pressure in the cylindrical space is less likely to drop. This allows smooth movement of the plunger in the protruding direction, and thus provides improved followability of the plunger to the slack in the chain. When the plunger is moved in the pushed-in direction, thereby reducing the volume of the pressure chamber, hydraulic oil leaks from the pressure chamber, through the leakage gap, and into the cylindrical space. From the cylindrical space, hydraulic oil flows through the communication passage and returns to the interior of the sleeve. This reduces the amount of hydraulic oil that is discharged from the chain tensioner to the outside thereof, by an amount equal to the amount of hydraulic oil returned to the interior of the sleeve, which in turn reduces the consumption of oil by the chain tensioner.

Preferably, a seating surface to be fixed to a vertically extending engine wall surface is formed on the outer periphery of the cylinder, and the communication passage is disposed such that, with the seating surface fixed to the engine wall surface, the communication passage is located at the upper half portion of the entire circumference of the sleeve.

In this arrangement, any air present in the sleeve can be smoothly discharged through the communication passage. Further, immediately after the engine is started, and while hydraulic oil has not yet been supplied to the chain tensioner, hydraulic oil retained in the sleeve flows into the pressure chamber, thus producing a damping force. In this regard, because the communication passage is disposed at the upper half of the entire circumference of the sleeve, it is possible to retain a large amount of hydraulic oil in the sleeve.

The end of the sleeve protruding out of the plunger may be press-fitted into a sleeve fitting recess formed in the closed end of the cylinder such that, due to the press-fitting, the sleeve is fixed in position.

In this arrangement, because the sleeve is fixed in position by press-fitting, even when the tension in the chain changes sharply, it is possible to prevent axial movement of the sleeve, thereby producing a stable damping force.

The sleeve may be pressed by one end of the return spring toward the closed end of the cylinder such that, due to the pressing force of the return spring, the sleeve is fixed in position.

In this arrangement, the chain tensioner can be manufactured at a lower cost than when the sleeve is fixed in position, e.g., by press-fitting.

Preferably, a reservoir chamber is defined in the interior of the sleeve, the reservoir chamber having a diameter larger than the diameter of the valve hole of the check valve.

In this arrangement, any air that may be mixed into hydraulic oil supplied from an oil pump is less likely to enter the pressure chamber, so that the chain tensioner can produce a stable damping force. Further, immediately after the engine is started, and while hydraulic oil has not yet been supplied to the chain tensioner, hydraulic oil retained in the sleeve flows into the pressure chamber, thus producing a damping force. In this regard, because the reservoir chamber has a diameter larger than the diameter of the valve hole of the check valve, it is possible to retain a large amount of hydraulic oil in the sleeve.

Preferably, the sleeve includes a large outer diameter portion defining the leakage gap between the large outer diameter portion and the inner periphery of the plunger, and a small outer diameter portion continuously connected, via a step, to the end of the large outer diameter portion closest to the end of the sleeve protruding out of the plunger, with the large outer diameter portion entirely received in the plunger.

In this arrangement, regardless of the axial position of the plunger, the length of the large outer diameter portion is defined as the axial length of the leakage gap between the outer periphery of the sleeve and the inner periphery of the plunger. This means that even when the plunger moves in the axial direction, the axial length of the leakage gap remains unchanged. The chain tensioner therefore provides a uniform damping force irrespective of the axial position of the plunger.

Preferably, a seal member is disposed between the sliding surfaces of the plunger and the cylinder to prevent leakage of hydraulic oil from the cylindrical space to the outside of the cylinder.

In this arrangement, because the seal member between the sliding surfaces of the plunger and the cylinder prevents leakage of hydraulic oil from the cylindrical space through the gap between sliding surfaces of the plunger and the cylinder to the outside of the cylinder, it is possible to effectively reduce the consumption of oil by the chain tensioner.

The communication passage may be a through hole extending radially through the sleeve at a location between the leakage gap and the end of the sleeve protruding out of the plunger.

A helical groove may be formed in the outer periphery of the sleeve to provide communication between the pressure chamber and the cylindrical space.

This arrangement allows accurate control of the magnitude of the damping force by changing the depth and/or lead angle of the helical groove.

The chain tensioner may further comprise:
a plurality of circumferential grooves disposed on the outer periphery of the plunger so as to be axially adjacent to each other;
a ring receiving groove formed in the inner periphery of the cylinder; and
a register ring received in the ring receiving groove, and configured to be elastically squeezed around any of the circumferential groove;
wherein each of the circumferential grooves includes:
  a tapered surface configured such that, when a load is applied to the plunger in the direction to protrude the plunger out of the cylinder, the tapered surface allows movement of the plunger while radially expanding the register ring; and
  a stopper surface configured such that, when a load is applied to the plunger in a direction to push the plunger into the cylinder, the stopper surface engages the register ring, thereby restricting the movement of the plunger.

Advantages of the Invention

The chain tensioner according to the present invention is structured such that, when the plunger moves in the protruding direction, and as a result, the volume of the cylindrical space increases, hydraulic oil flows from the oil supply passage directly into the cylindrical space. Thus, the pressure in the cylindrical space is less likely to drop, so that the plunger moves smoothly in the protruding direction. This chain tensioner therefore shows excellent followability to the slack in the chain. When the plunger moves in the pushed-in direction, and as a result, the volume of the pressure chamber decreases, hydraulic oil leaks from the pressure chamber, through the leakage gap, and into the cylindrical space. Then, from the cylindrical space, hydraulic oil flows through the communication passage and returns to the interior of the sleeve. This reduces the amount of hydraulic oil that is discharged from the chain tensioner to the outside thereof, by an amount equal to the amount of hydraulic oil returned to the interior of the sleeve, which in turn reduces the consumption of oil by the chain tensioner.

EMBODIMENTS

Figure 1:
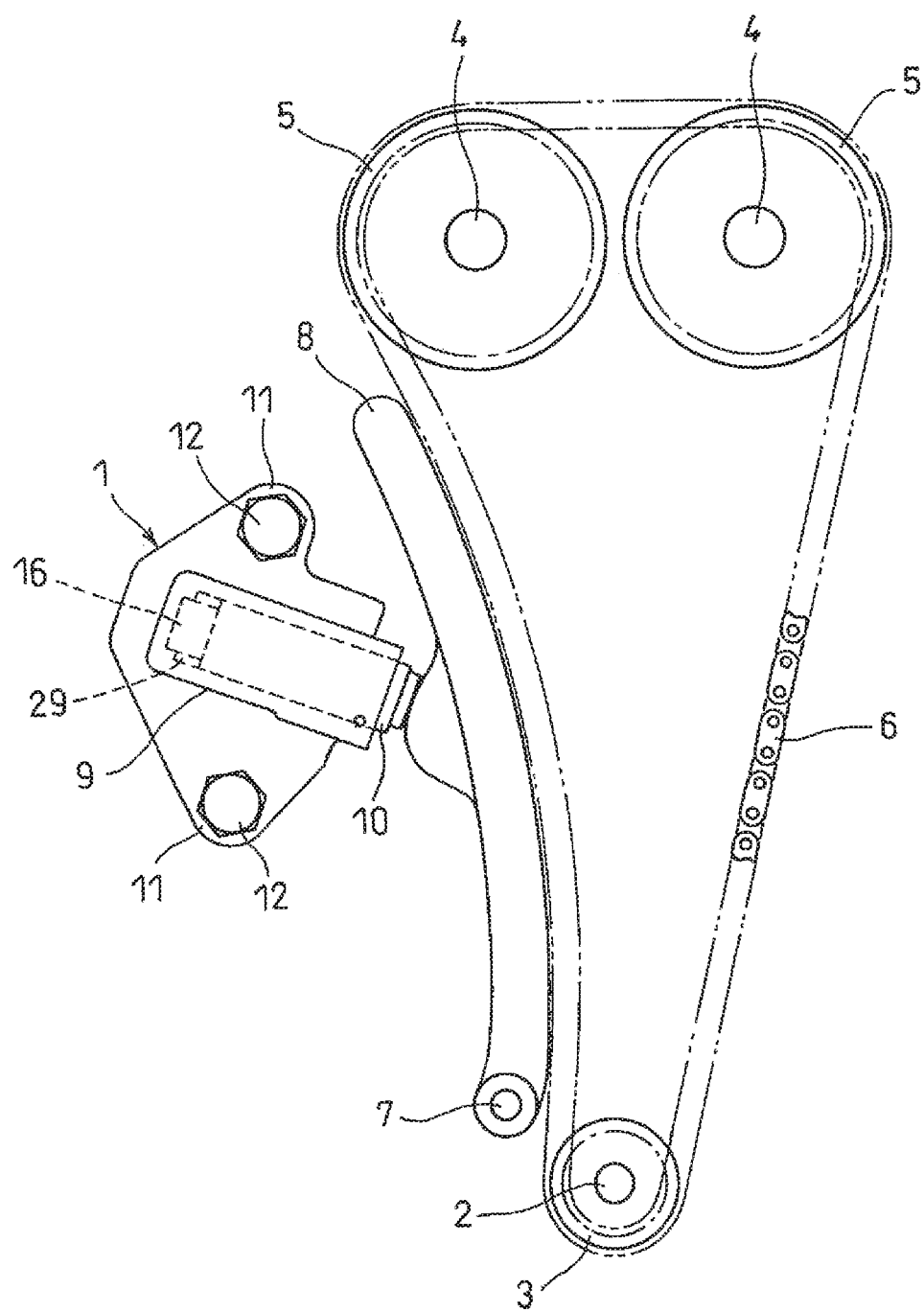
FIG. 1 is a partially sectional view of a chain transmission system into which a chain tensioner according to a first embodiment of the present invention is incorporated.

FIG. 1 shows a chain transmission system including the chain tensioner 1 according to the first embodiment of the present invention. This chain transmission system includes a sprocket 3 fixed to a crankshaft 2 of an engine, sprockets 5 fixed to camshafts 4, and a chain 6 coupling the sprockets 3 and 5 together to transmit the rotation of the crankshaft to the camshafts 4, thereby opening and closing valves (not shown) of combustion chambers by the rotation of the camshafts 4.

While the engine is running, the crankshaft 2 always rotates in the same direction (clockwise direction in the example of FIG. 1), and while the engine is rotating in the clockwise direction, the section of the chain 6 moving toward the sprocket 3 (right-hand side of the chain in FIG. 1) becomes the tight side, while the section of the chain 6 moving away from the sprocket 3 (left-hand side in FIG. 1) becomes the slack side. A chain guide 8 is in contact with the slack side of the chain 6 while being pivotally supported about a pivot shaft 7. The chain tensioner 1 presses the chain 6 via the chain guide 8.

Figure 2:
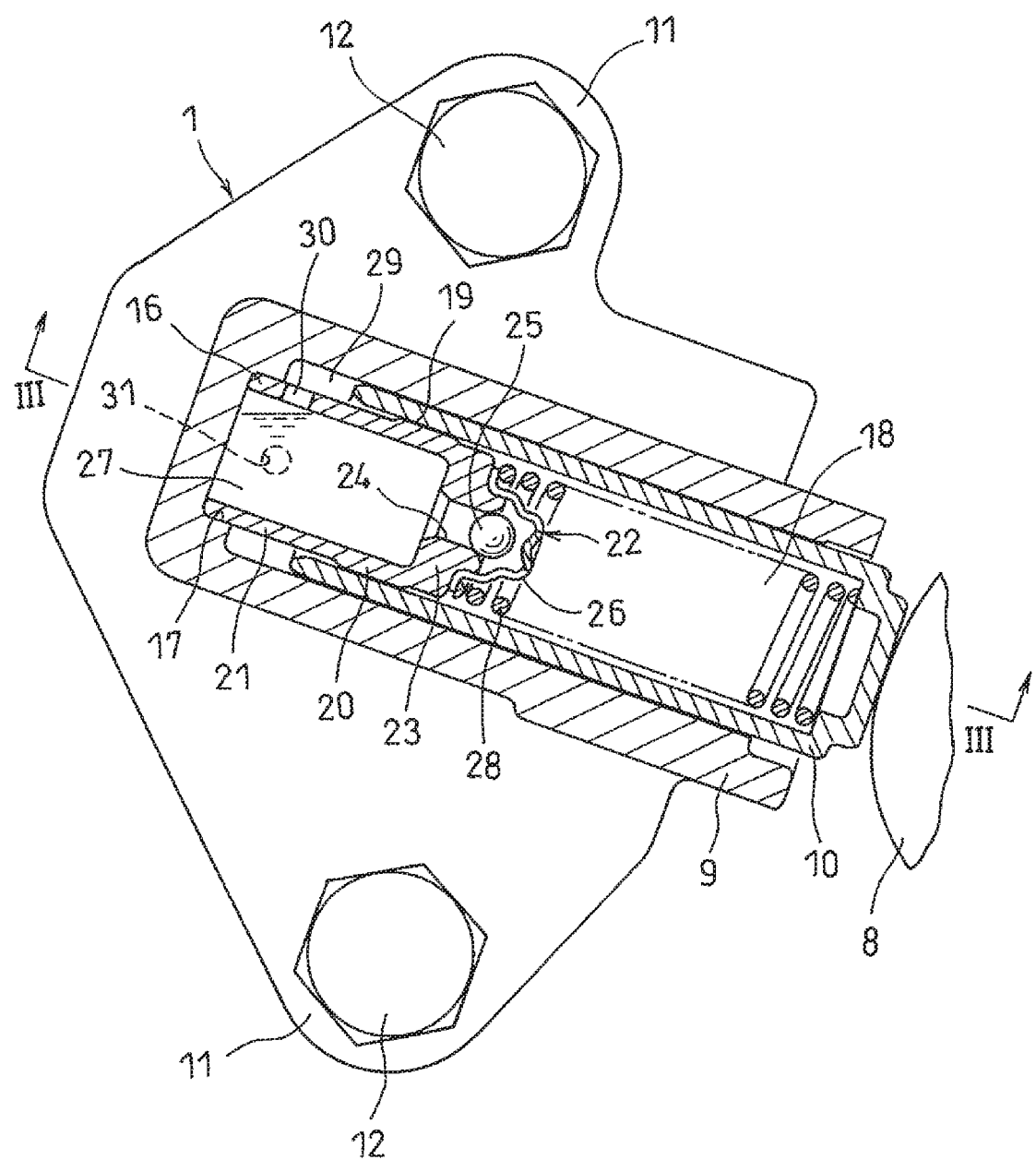
FIG. 2 is an enlarged sectional view of the chain tensioner of FIG. 1 and its vicinity.

As shown in FIG. 2, the chain tensioner 1 includes a tubular cylinder 9 having an open end and a closed end, and a plunger 10 axially slidably supported by the inner periphery of the cylinder 9. The plunger 10 has a protruding end protruding out of the cylinder 9 and pressing the chain guide 8.

The cylinder 9 is a one-piece member made of a metal (such as an aluminum alloy). The cylinder 9 has a plurality of mounting pieces 11 integrally formed on the outer periphery of the cylinder 9, and is fixed to an engine wall surface 13 (shown in FIG. 3) by inserting bolts 12 through the mounting pieces 11 and tightening the bolts 12. A flat seating surface 14 is formed on the outer periphery of the cylinder 9 so as to extend parallel to the center axis of the cylinder 9. The seating surface 14 is fixedly attached to the engine wall surface 13, which extends in the vertical direction. The cylinder 9 is mounted to the engine wall surface 13 such that the protruding direction, i.e., the direction in which the plunger 10 protrudes out of the cylinder 9, is an obliquely downward direction. The engine wall surface 13 is a side surface of an engine block 15.

The plunger 10 is a tubular member having an open end inserted in the cylinder 9 with the protruding end, i.e., the end of the plunger 9 protruding out of the cylinder 9, closed. The plunger 10 is made of an iron-based material (e.g., a steel material such as "SCM" or "SCr"). The outer periphery of the plunger 10 is a cylindrical surface, and the inner periphery of the cylinder 9 is also a cylindrical surface. The gap between the outer periphery of the plunger 10 and the inner periphery of the cylinder 9 is minute. Specifically, the difference in radius between the outer periphery of the plunger 10 and the inner periphery of the cylinder 9 is adjusted within the range of 0.015-0.080 mm.

A sleeve 16 is disposed in the cylinder 9 with one end of the sleeve 16 inserted in the plunger 10 and the other end protruding out of the plunger 10. The other end of the sleeve 16, i.e., its end protruding out of the plunger 10, is press-fitted into a sleeve fitting recess 17 formed in the closed end of the cylinder 9, and due to this press fitting, the sleeve 16 is fixed in position. As with the plunger 10, the sleeve 16 is also made of an iron-based material (such as SCr or SCM material).

The inner periphery of the plunger 10 is axially slidably fitted to the outer periphery of the sleeve 16, and due to this fitting, a pressure chamber 18 is defined in the plunger 10. The volume of the pressure chamber 18 increases when the plunger 10 moves in the protruding direction, and decreases when the plunger 10 moves in the pushed-in direction. Between the outer periphery of the sleeve 16 and the inner periphery of the plunger 10, a leakage gap 19 is defined through which hydraulic oil in the pressure chamber 18 leaks when the volume of the pressure chamber 18 decreases. The leakage gap 19 is a minute cylindrical gap having a radial width within the range of 0.015-0.080 mm.

The sleeve 16 has a large outer diameter portion 20 which defines the leakage gap 19 between the portion 20 and the inner periphery of the plunger 10; and a small outer diameter portion 21 continuously connected, via a step, to the end of the large outer diameter portion 20 closest to the end of the sleeve 16 protruding out of the plunger 10. The large outer diameter portion 20 of the sleeve 16 is entirely received in the plunger 10, so that the axial length of the leakage gap 19 never changes when the plunger 10 moves in the axial direction according to fluctuations in tension in the chain 6.

A check valve 22 is disposed at the end of the sleeve 16 inserted in the plunger 10, and allows only a flow of hydraulic oil from inside the sleeve 16 to outside the sleeve 16. The check valve 22 comprises a valve seat 23 at the end of the sleeve 16 inserted in the plunger 10; a valve hole 24 extending through the valve seat 23 in the axial direction of the sleeve 16; a spherical valve element 25 for opening and closing the valve hole 24 from the side of the pressure chamber 18; and a retainer 26 restricting the moving range of the valve element 25. The sleeve 16 defines therein a reservoir chamber 27 larger in diameter than the valve hole 24 of the check valve 22 and located upstream of the check valve 22. The check valve 22 restricts a flow of hydraulic oil from the pressure chamber 18 toward the reservoir chamber 27, and allows only a flow of hydraulic oil from the reservoir chamber 27 toward the pressure chamber 18.

A return spring 28 is mounted in the pressure chamber 18. The return spring 28 has one end thereof supported by the sleeve 16 through the check valve 22, and the other end thereof axially presses the plunger 10, thereby biasing the plunger 10 in the direction in which the plunger 10 protrudes out of the cylinder 9.

Between the outer periphery of the sleeve 16 and the inner periphery of the cylinder 9, a cylindrical space 29 is defined by the plunger 10 such that the volume of the cylindrical space 29 changes with axial movement of the plunger 10. In the example shown, the cylindrical space 29 is defined radially between the outer periphery of the small outer diameter portion 21 of the sleeve 16 and the inner periphery of the cylinder 9 such that the volume of the cylindrical space 29 changes with a change in the length of the portion of the plunger 10 that is inserted into this space.

The sleeve 16 has a communication passage 30 through which the cylindrical space 29 communicates with the reservoir chamber 27. The communication passage 30 is a through hole extending radially through the sleeve 16 at a location between the leakage gap 19 and the end of the sleeve 16 protruding out of the plunger 10. The communication passage 30 is disposed such that, with the seating surface 14 of the cylinder 9 fixed to the engine wall surface 13, the communication passage 30 is located at the upper half of the entire circumference of the sleeve 16. Specifically, the communication passage 30 is disposed at the radially upper portion of the sleeve 16 within the range equivalent to half the circumference of the sleeve 16. As used herein, the term the "radially upper portion" refers to the portion of the outer periphery of the sleeve 16 located, with the chain tensioner 1 mounted to the engine, above the center axis of the sleeve 16. In the example shown, the communication passage 30 is provided so as to be disposed, with the chain tensioner 1 mounted to the engine, at the apex of the outer periphery of the sleeve 16.

Figure 3:
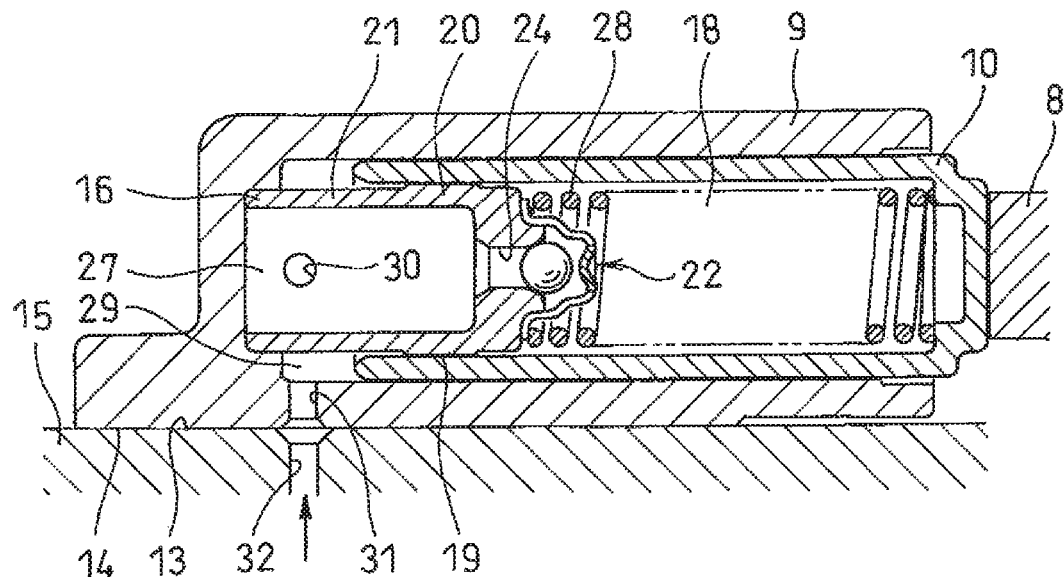
FIG. 3 is a sectional view taken along line III-III of FIG. 2.

As shown in FIG. 3, the cylinder 9 has an oil supply passage 31 for introducing hydraulic oil from outside the cylinder 9 into the cylinder 9. The oil supply passage 31 is a through hole extending radially through the cylinder 9. The oil supply passage 31 has an oil inlet which is open at the seating surface 14 on the outer periphery of the cylinder 9 so that the oil inlet is connectable to an oil hole 32 formed in the engine block 15. The oil outlet of the oil supply passage 31 is open at a cylindrical surface on the inner periphery of the cylinder 9 (which defines the outer perimeter of the cylindrical space 29). The oil supply passage 31 introduces hydraulic oil supplied from an oil pump (not shown) through the oil hole 32 into the cylindrical space 29.

An exemplary operation of the chain tensioner 1 is now described.

Figure 4:
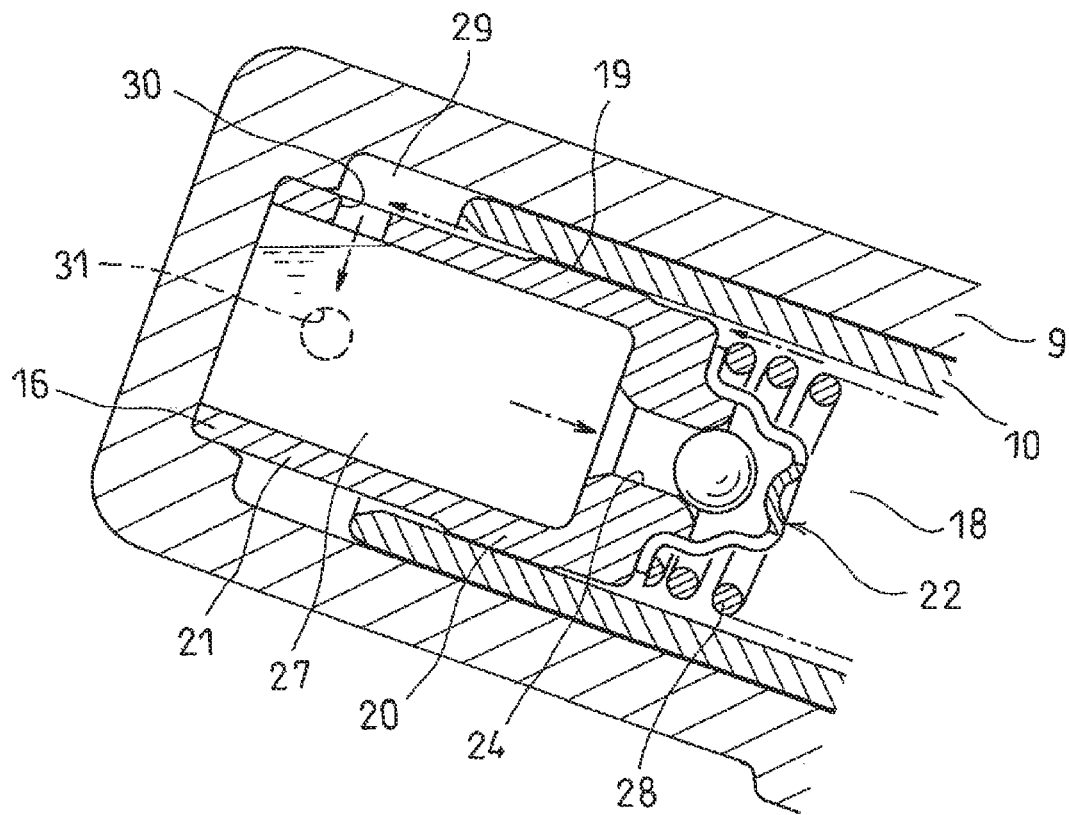
FIG. 4 is an enlarged view of a cylindrical space of FIG. 2 and its vicinity.

When the tension in the chain 6 increases while the engine is running, the plunger 10 is moved by the tension in the chain 6 in the direction in which the plunger 10 is pushed into the cylinder 9, thus reducing the tension in the chain 6. As the plunger 10 is moved in this direction, the volume of the pressure chamber 18 decreases according to the amount of movement of the plunger 10, so that hydraulic oil flows out of the pressure chamber 18 by an amount corresponding to the reduced volume of the pressure chamber 18, and this hydraulic oil then flows through the leakage gap 19 and through the cylindrical space 29. While flowing through the leakage gap 19, the hydraulic oil produces a damping force due to its viscous resistance, so that the plunger 10 moves slowly. As shown in FIG. 4, the hydraulic oil that has flowed through the leakage gap 19 flows through the cylindrical space 29, and then partially flows through the communication passage 30 and returns to the reservoir chamber 27. Thus, the amount of hydraulic oil that flows through the gap between the sliding surfaces of the plunger 10 and the cylinder 9 and out of the cylinder 9 decreases by an amount equal to the amount of hydraulic oil returned to the reservoir chamber 27.

On the other hand, when the tension in the chain 6 decreases while the engine is running, the plunger 10 moves in the protruding direction due to the biasing force of the return spring 28, thus removing the looseness of the chain 6. As the plunger 10 moves in this direction, the volume of the pressure chamber 18 increases according to the amount of movement of the plunger 18. This opens the check valve 22, and hydraulic oil flows from the reservoir chamber 27 into the pressure chamber 18, so that the plunger 10 moves quickly. While the plunger 10 is moving in this direction, hydraulic oil flows through the oil supply passage 31, through the cylindrical space 29, and then through the communication passage 30, and flows into the reservoir chamber 27.

As the plunger 10 moves in the protruding direction, the volume of the cylindrical space 29 increases according to the movement of the plunger 10. If, in this state, hydraulic oil or air is not supplied into the cylindrical space 29, the pressure in the cylindrical space 29 will decrease, and the decrease in pressure in the cylindrical space 29 could interfere with the movement of the plunger 10 in the protruding direction. Also, with the recent trend of using smaller oil pumps in automobiles, the need to reduce the oil consumption by a chain tensioner such as the chain tensioner 1 is increasing.

In this regard, because this tensioner 1 is configured such that when the plunger 10 moves in the protruding direction and the volume of the cylindrical space 29 increases, hydraulic oil flows into the cylindrical space 29 directly from the oil supply passage 31, the pressure in the cylindrical space 29 is less likely to decrease. As a result, the plunger 10 can smoothly move in the protruding direction, and thus shows excellent followability to the slack in the chain 6.

Moreover, because this chain tensioner 1 is configured such that when the plunger 10 moves in the pushed-in direction and the volume of the pressure chamber 18 decreases, hydraulic oil leaks from the pressure chamber 18, through the leakage gap 19, and into the cylindrical space 29, and from the cylindrical space 29, hydraulic oil partially flows through the communication passage 30 and returns to the interior of the sleeve 16, it is possible to reduce the amount of hydraulic oil discharged from the chain tensioner to the outside, by an amount equal to the amount of hydraulic oil returned to the interior of the sleeve 16. Thus, this chain tensioner 1 consumes less oil.

Further, because this chain tensioner 1 is positioned such that the communication passage 30 is disposed at the upper half of the entire circumference of the sleeve 16, any air that may be present inside the sleeve 16 can be smoothly expelled through the communication passage 30. Further, immediately after the engine is started, and while hydraulic oil has not yet been supplied to the chain tensioner 1, hydraulic oil retained in the sleeve 16 flows into the pressure chamber 18, thus producing a damping force. In this regard, because the communication passage 30 is disposed at the upper half of the entire circumference of the sleeve 16, it is possible to retain a large amount of hydraulic oil in the sleeve 16.

Moreover, because the sleeve 16 of this chain tensioner 1 is fixed in position by press-fitting the end of the sleeve 16 protruding out of the plunger 10, into the sleeve fitting recess 17 formed in the closed end of the cylinder 9, even when the tension in the chain 6 changes sharply, the sleeve 16 is prevented from axial movement under the pressure of hydraulic oil in the reservoir chamber 27. Thus, this chain tensioner is capable of producing a stable damping force.

Moreover, because this chain tensioner 1 has in the sleeve 16 a reservoir chamber 27 having a diameter larger than the diameter of the valve hole 24 of the check valve 22, a large amount of hydraulic oil can be retained in the sleeve 16. Thus, immediately after the engine is started and while hydraulic oil has not yet been supplied to the chain tensioner 1, hydraulic oil retained in the sleeve 6 flows into the pressure chamber 18, providing a damping force.

As described above, the sleeve 16 of this chain tensioner 1 includes a large outer diameter portion 20 that defines a leakage gap 19 between the portion 20 and the inner periphery of the plunger 10; and a small outer diameter portion 21 continuously connected, via a step, to the end of the large outer diameter portion 20 closest to the end of the sleeve 16 protruding out of the plunger 10, such that the large outer diameter portion 20 is entirely received in the plunger 10. Thus, regardless of the axial position of the plunger 10, the length of the large outer diameter portion 20 is defined as the axial length of the leakage gap 19 between the outer periphery of the sleeve 16 and the inner periphery of the plunger 10. This means that even when the plunger 10 moves in the axial direction, the axial length of the leakage gap 19 remains unchanged. The chain tensioner therefore provides a uniform damping force irrespective of the axial position of the plunger 10.

Figure 5:
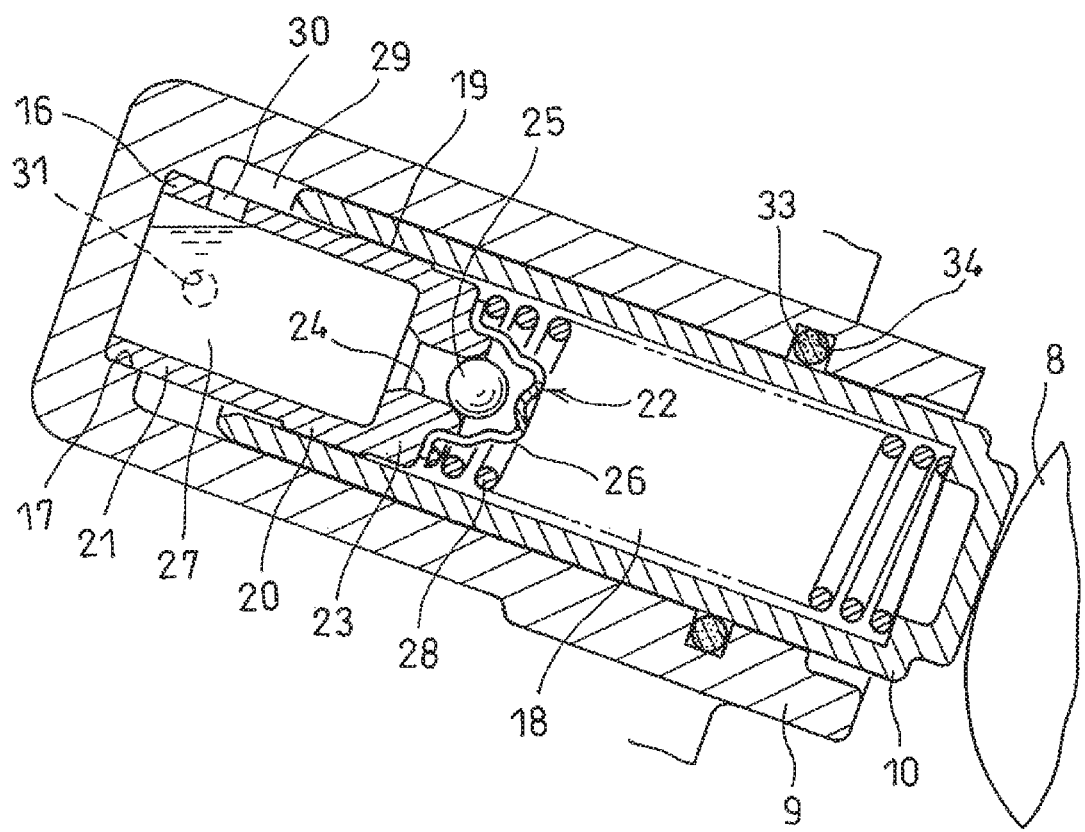
FIG. 5 corresponds to FIG. 2 and shows a chain tensioner of a second embodiment of the present invention.

FIG. 5 shows the chain tensioner according to the second embodiment of the present invention. Elements corresponding to those of the first embodiment are denoted by identical reference symbols, and their description is omitted.

A seal member 33 is disposed between the sliding surfaces of the plunger 10 and the cylinder 9 to prevent leakage of hydraulic oil from the cylindrical space 29 to the outside. Here, the seal member 33 is an annular rubber member (such as an O-ring). The seal member 33 is received in a ring groove 34 formed in the inner periphery of the cylinder 9, and is in contact with the outer cylindrical surface of the plunger 10 so as to be slidable in the axial direction.

In the chain tensioner of the second embodiment, because the seal member 33 between the sliding surfaces of the plunger 10 and the cylinder 9 prevents hydraulic oil from the cylindrical space 29, through the gap between the sliding surfaces of the plunger 10 and the cylinder 9, to the outside of the cylinder 9, it is possible to effectively reduce the amount of oil consumed by the chain tensioner.

Figure 6:
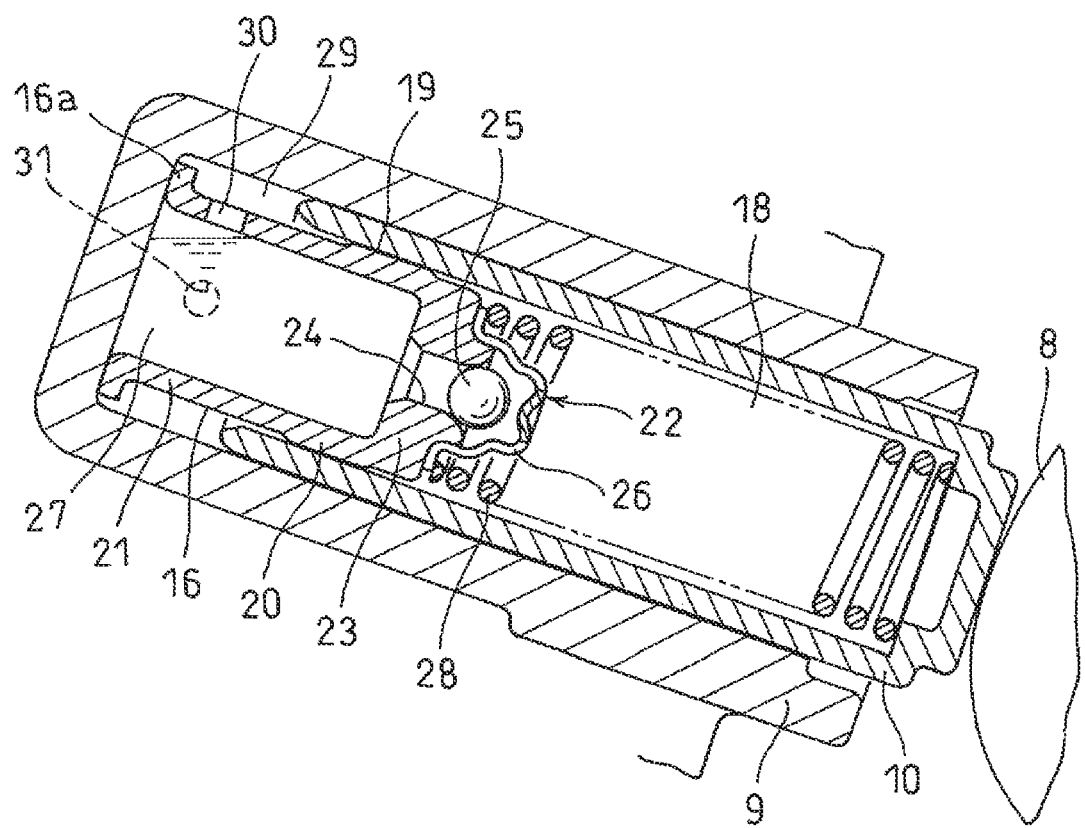
FIG. 6 corresponds to FIG. 2 and shows a chain tensioner of a third embodiment of the present invention.

FIG. 6 shows the chain tensioner according to the third embodiment. Elements corresponding to those of the first embodiment are denoted by identical reference symbols, and their description is omitted.

The end of the sleeve 16 protruding out of the plunger 10 abuts a flat surface formed on the closed end of the cylinder 9 so as to be perpendicular to the axis of the cylinder 9. The sleeve 16 is pressed by one end of the return spring 28 toward the closed end of the cylinder 9, and fixed in position by the pressing force from the return spring 28. An outwardly extending flange 16a is integrally formed at the end of the sleeve 16 protruding out of the plunger 10 (i.e., at the end of the small outer diameter portion 21 farthest from the large outer diameter portion 20).

The chain tensioner of the third embodiment can be manufactured at a lower cost than the chain tensioner of the first embodiment, in which the sleeve 16 is fixed in position by press-fitting.

Figure 7:
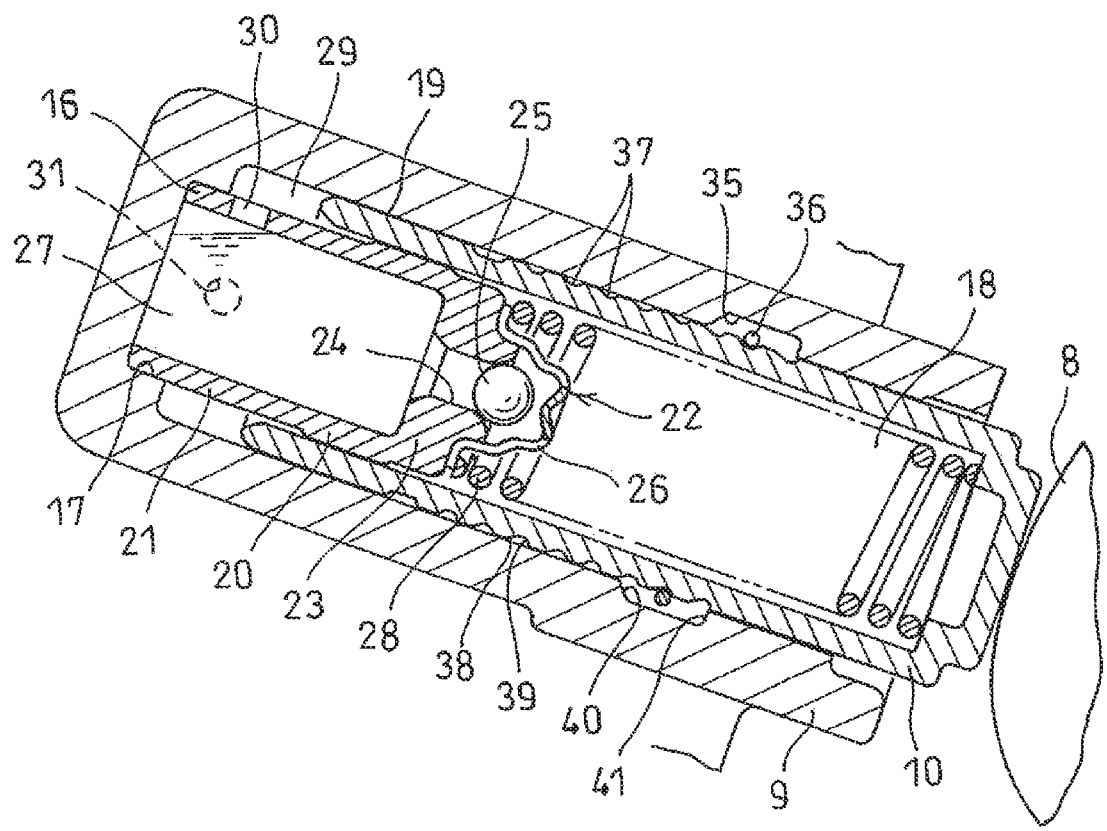
FIG. 7 corresponds to FIG. 2 and shows a chain tensioner of a fourth embodiment of the present invention.

FIG. 7 shows the chain tensioner according to the fourth embodiment of the present invention. Elements corresponding to those of the first embodiment are denoted by identical reference symbols and their description is omitted.

A circumferentially extending ring receiving groove 35 is formed in the inner periphery of the cylinder 9 at its portion close to the open end of the cylinder 9. A register ring 36 having one circumferential portion thereof cut apart is axially movably received in the ring receiving groove 35. The outer periphery of the plunger 10 has a plurality of axially adjacent circumferential grooves 37 such that the register ring 36 can be fitted in any of the circumferential grooves 37 while being elastically squeezed around the circumferential groove 37. Each circumferential groove 37 includes a tapered surface 38 rising at the end of the circumferential groove 37 close to the end of the plunger 10 that is inserted in the cylinder 9, and a stopper surface 39 rising at the end of the circumferential groove 37 close to the end of the plunger 10 protruding out of the cylinder 9. The tapered surface 38 rises less steeply, and when a load is applied to the plunger 10 in the direction to protrude the plunger 10 out of the cylinder 9, the tapered surface 38 allows movement of the plunger 10 while radially expanding the register ring 36. On the other hand, the stopper surface 39 rises steeply, and when a load is applied to the plunger 10 in the direction to push the plunger 10 into the cylinder 9, the stopper surface 39 engages the register ring 36, thereby restricting the movement of the plunger 10.

The ring receiving groove 35 includes a tapered inner peripheral surface 40 rising at the end of the ring receiving groove 36 close to the closed end of the cylinder 9, and an end surface 41 rising at a right angle relative to the axial direction, at the end of the ring receiving groove 35 close to the open end of the cylinder 9. The tapered inner peripheral surface 40 rises less steeply, and when the plunger 10 moves in the pushed-in direction, the tapered inner peripheral surface 40 receives the register ring 36 so as to restrict radial expansion of the register ring 36. The end surface 41 receives the register ring 36 when the plunger 10 moves in the protruding direction so as to prevent any further movement of the register ring 36, while allowing radial expansion of the register ring 36 in this state.

By using the chain tensioner of the fourth embodiment, even if, when the engine is stopped, the camshafts 4 (see FIG. 1) stops at positions where the tension in the chain 6 is high, the engagement of the register ring 36 and the circumferential groove 37 prevent movement of the plunger 10 in the pushed-in direction. Thus, when the engine is restarted, the chain 6 is less likely to become slack, which allows smooth start of the engine.

Figure 8:
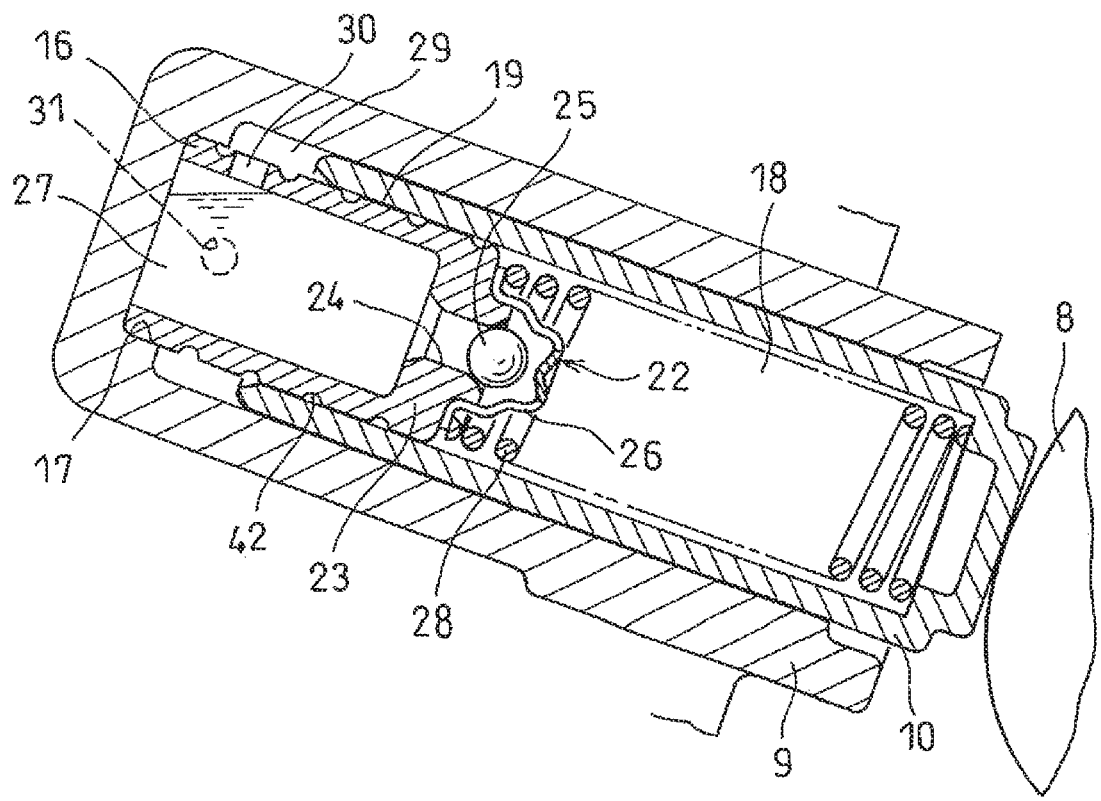
FIG. 8 corresponds to FIG. 2 and shows a chain tensioner of a fifth embodiment of the present invention.

FIG. 8 shows the chain tensioner according to the fourth embodiment of the present invention. Elements corresponding to those of the first embodiment are denoted by identical reference numerals and their description is omitted.

Figure 9:
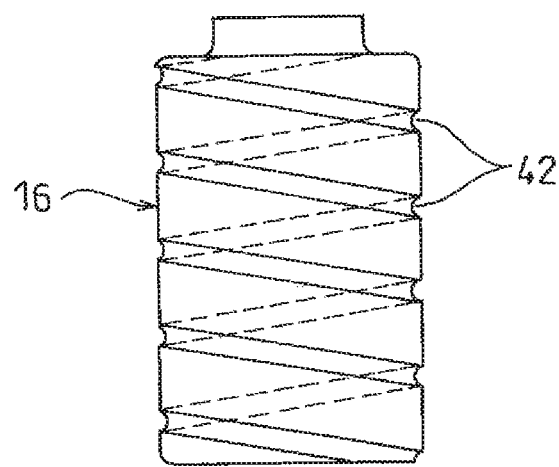
FIG. 9 shows a sleeve removed from the chain tensioner of FIG. 8.

A helical groove 42 is formed in the outer periphery of the sleeve 16 at its portion in sliding contact with the inner periphery of the plunger 10. Via the helical groove 42, the pressure chamber 18 and the cylindrical space 29 communicate with each other. As shown in FIG. 9, the helical groove 42 is a groove extending obliquely relative to the circumferential direction with a predetermined lead angle.

By using the chain tensioner of the fifth embodiment, it is possible to adjust the damping force by changing the depth and/or lead angle of the helical groove 42.

While the chain tensioner of each of the embodiments is incorporated into a chain transmission system that transmits the rotation of a crankshaft 2 to camshafts 4, the chain tensioner according to the present invention may be incorporated into a chain transmission system that transmits the rotation of a crankshaft 2 to engine accessories such as an oil pump, a water pump and/or a supercharger; a chain transmission system that transmits the rotation of a crankshaft 2 to a balancer shaft; or a chain transmission system coupling together intake cams and exhaust cams of a twin-cam engine.

It should be understood that the embodiments disclosed herein are all mere examples and not intended to restrict the invention. The scope of the present invention is defined by the claims and not by the description above, and the present invention covers all modifications that are within the scope of the claims, both literally and equivalently.

DESCRIPTION OF THE REFERENCE SYMBOLS

1. Chain tensioner
9. Cylinder
10. Plunger
13. Engine wall surface
14. Seating surface
16. Sleeve
17. Sleeve fitting recess
18. Pressure chamber
19. Leakage gap
20. Large outer diameter portion
21. Small outer diameter portion
22. Check valve
24. Valve hole
27. Reservoir chamber
28. Return spring
29. Cylindrical space
30. Communication passage
31. Oil supply passage
33. Seal member
35. Ring receiving groove
36. Register ring
37. Circumferential groove
38. Tapered surface
39. Stopper surface
42. Helical groove

What is claimed is:

1. A chain tensioner comprising:
   a tubular cylinder having an open end and a closed end;
   a tubular plunger axially slidably supported by an inner periphery of the tubular cylinder, the tubular plunger having an open end inserted in the tubular cylinder, and a closed end protruding out of the tubular cylinder;
   a return spring biasing the tubular plunger in a direction in which the tubular plunger protrudes out of the tubular cylinder;
   a sleeve fixedly disposed in the tubular cylinder, with a first end of the sleeve inserted in the tubular plunger and a second end of the sleeve protruding out of the tubular plunger;
   a check valve disposed at the first end of the sleeve, the check valve being configured to allow only a flow of hydraulic oil from inside the sleeve toward outside of the sleeve;
   a pressure chamber defined in the tubular plunger such that a volume of the pressure chamber changes with axial movement of the tubular plunger;
   a leakage gap defined between an outer periphery of the sleeve and an inner periphery of the tubular plunger such that, when the volume of the pressure chamber decreases, hydraulic oil leaks from the pressure chamber through the leakage gap;
   a cylindrical space defined between the outer periphery of the sleeve and the inner periphery of the tubular cylinder, the cylindrical space being defined by the tubular plunger such that a volume of the cylindrical space changes with the axial movement of the tubular plunger;
   an oil supply passage defined in the tubular cylinder so as to introduce hydraulic oil from outside the tubular cylinder to inside the tubular cylinder, the oil supply passage opening to the cylindrical space; and
   a communication passage defined in the sleeve and providing communication between the cylindrical space and an interior of the sleeve,
   wherein:
   a seating surface is formed on an outer periphery of the tubular cylinder, the seating surface being configured to be fixed to a vertically extending engine wall surface such that the seating surface faces and adjoins the vertically extending engine wall surface; and
   the chain tensioner is configured such that, when the seating surface is fixed to the vertically extending engine wall surface, the communication passage is located only at an upper half portion of an entire circumference of the sleeve, and a lower half portion of the entire circumference of the sleeve is free of a communication passage defined in the sleeve and providing communication between the cylindrical space and the interior of the sleeve.

2. The chain tensioner of claim 1, wherein the second end of the sleeve is press-fitted into a sleeve fitting recess defined in the closed end of the tubular cylinder such that, due to the press-fitting, the sleeve is fixed in position.

3. The chain tensioner of claim 2, wherein a seal member is disposed between sliding surfaces of the tubular plunger and the tubular cylinder, the seal member preventing leakage of hydraulic oil from the cylindrical space to outside of the tubular cylinder.

4. The chain tensioner of claim 2, wherein the communication passage is a through hole extending radially through the sleeve at a location between the leakage gap and the second end of the sleeve.

5. The chain tensioner of claim 1, wherein the sleeve is pressed by one end of the return spring toward the closed end of the tubular cylinder such that, due to a pressing force of the return spring, the sleeve is fixed in position.

6. The chain tensioner of claim 1, wherein a reservoir chamber is defined in the interior of the sleeve, the reservoir chamber having a diameter larger than a diameter of a valve hole of the check valve.

7. The chain tensioner of claim 6, wherein a seal member is disposed between sliding surfaces of the tubular plunger and the tubular cylinder, the seal member preventing leakage of hydraulic oil from the cylindrical space to outside of the tubular cylinder.

8. The chain tensioner of claim 6, wherein the communication passage is a through hole extending radially through the sleeve at a location between the leakage gap and the second end of the sleeve.

9. The chain tensioner of claim 1, wherein the sleeve includes:
   a large outer diameter portion defining the leakage gap between the large outer diameter portion and the inner periphery of the tubular plunger; and
   a small outer diameter portion continuously connected, via a step, to an end of the large outer diameter portion closest to the second end of the sleeve, and wherein the large outer diameter portion is entirely received in the tubular plunger.

10. The chain tensioner of claim 9, wherein a seal member is disposed between sliding surfaces of the tubular plunger and the tubular cylinder, the seal member preventing leakage of hydraulic oil from the cylindrical space to outside of the tubular cylinder.

11. The chain tensioner of claim 9, wherein the communication passage is a through hole extending radially through the sleeve at a location between the leakage gap and the second end of the sleeve.

12. The chain tensioner of claim 1, wherein a seal member is disposed between sliding surfaces of the tubular plunger and the tubular cylinder, the seal member preventing leakage of hydraulic oil from the cylindrical space to outside of the tubular cylinder.

13. The chain tensioner of claim 12, wherein the communication passage is a through hole extending radially through the sleeve at a location between the leakage gap and the second end of the sleeve.

14. The chain tensioner of claim 1, wherein the communication passage is a through hole extending radially through the sleeve at a location between the leakage gap and the second end of the sleeve.

15. The chain tensioner of claim 1, wherein a helical groove is defined in the outer periphery of the sleeve, the helical groove providing communication between the pressure chamber and the cylindrical space.

16. The chain tensioner of claim 1, further comprising:
a plurality of circumferential grooves disposed on an outer periphery of the tubular plunger so as to be axially adjacent to each other;
a ring receiving groove defined in the inner periphery of the tubular cylinder; and
a register ring received in the ring receiving groove, and configured to be elastically squeezed around any of the plurality of circumferential grooves;
wherein each of the plurality of circumferential grooves includes:
a tapered surface configured such that, when a load is applied to the tubular plunger in the direction to protrude the plunger out of the tubular cylinder, the tapered surface allows movement of the tubular plunger while radially expanding the register ring; and
a stopper surface configured such that, when a load is applied to the tubular plunger in a direction to push the tubular plunger into the tubular cylinder, the stopper surface engages the register ring, thereby restricting the movement of the tubular plunger.

* * * * *